United States Patent
Oshima et al.

(10) Patent No.: US 7,416,806 B2
(45) Date of Patent: Aug. 26, 2008

(54) FUEL CELL SYSTEM FOR AN AUTOMOTIVE VEHICLE

(75) Inventors: Hisayoshi Oshima, Oobu (JP); Kunio Okamoto, Okazaki (JP)

(73) Assignee: Denso Corporation, Kariya (JP)

( * ) Notice: Subject to any disclaimer, the term of this patent is extended or adjusted under 35 U.S.C. 154(b) by 679 days.

(21) Appl. No.: 10/968,031

(22) Filed: Oct. 20, 2004

(65) Prior Publication Data

US 2005/0112417 A1    May 26, 2005

(30) Foreign Application Priority Data

Nov. 21, 2003    (JP) ............................. 2003-392336

(51) Int. Cl.
    *H01M 8/02*    (2006.01)
    *H01M 8/10*    (2006.01)
(52) U.S. Cl. .......................................... 429/34; 429/30
(58) Field of Classification Search ............... 429/30, 429/34, 38, 39
    See application file for complete search history.

(56) References Cited

U.S. PATENT DOCUMENTS

| | | | |
|---|---|---|---|
| 6,460,733 B2 * | 10/2002 | Acker et al. ................... 222/94 |
| 6,506,513 B1 * | 1/2003 | Yonetsu et al. ................. 429/34 |
| 6,544,677 B2 * | 4/2003 | Matejcek ................... 429/34 X |
| 7,041,404 B2 * | 5/2006 | Zimmermann ............ 429/34 X |
| 2003/0168024 A1 | 9/2003 | Qian et al. ....................... 123/3 |
| 2006/0170390 A1 * | 8/2006 | Kikuchi et al. ............... 320/101 |

FOREIGN PATENT DOCUMENTS

JP    A 2003-184666    7/2003

OTHER PUBLICATIONS

Ikeda, "A Guide to Visual Technology—Everything in Fuel Cell," First Edition, pp. 209-219 (Aug. 20, 2001).

* cited by examiner

*Primary Examiner*—Stephen J. Kalafut
(74) *Attorney, Agent, or Firm*—Oliff & Berridge, PLC

(57) ABSTRACT

A fuel cell system includes a windshield washer container 1 storing windshield washer fluid, a permeable membrane unit 2 provided inside the windshield washer container 1, and a fuel cell 11. The permeable membrane unit 2 has the capability of extracting methanol from the windshield washer fluid. The extracted methanol is directly used as the fuel for the fuel cell 11. The windshield washer container 1 has the size comparable with or less than that of a conventional windshield washer container.

11 Claims, 3 Drawing Sheets

FUEL CELL SYSTEM FOR AN AUTOMOTIVE VEHICLE

CROSS-REFERENCE TO RELATED APPLICATION

This application is based upon and claims the benefit of priority of the Japanese Patent Application No. 2003-392336, filed on Nov. 21, 2003, so that the description of which is incorporated herein by reference.

BACKGROUND OF THE INVENTION

The present invention relates to a fuel cell system which is, for example, preferably used as an auxiliary power source of an automotive vehicle.

Automotive vehicles are recently equipped with many electronic devices. Accordingly, a great amount of electric power is required for the automotive vehicle. In general, the automotive vehicle installs an alternator to generate electric power and a battery to store electric power. Meanwhile, various kinds of fuel cells are already proposed as effective devices capable of supplying electric power to the automotive vehicles.

One of the conventionally known fuel cells is a polyelectrolyte fuel cell (hereinafter, referred to as PEFC). Furthermore, as a fuel cell system using this fuel cell, the Japanese Patent Application Laid-open No. 2003-184666, corresponding to the U.S. Patent Application Publication No. U.S. 2003/0168024A1, discloses a system which uses gasoline or methanol as the fuel and generates electric power by using hydrogen extracted from this fuel through a reformer.

However, according to such a fuel cell system, it is necessary to install a heavy and expensive reformer on a vehicle. Furthermore, the reformer is generally dissatisfactory in its performance because it cannot quickly and accurately respond to frequent accelerating/decelerating and stopping operations or other load changes occurring in the automotive vehicle.

On the other hand, another example of the fuel cell is a direct methanol fuel cell (hereinafter, referred to as DMFC) which is for example disclosed in "A Guide to Visual Technology—Everything in Fuel Cell—," first edition, pp 209 to 219, written by Konosuke IKEDA, published by Nippon Jitsugyo Publishing Co. Ltd., Aug. 20, 2001. The direct methanol fuel cell is a kind of PEFC, and is characterized in that no reforming of methanol into hydrogen is required and accordingly the methanol can be directly used as the fuel to generate electric power. Accordingly, the fuel cell system using the DMFC requires no reformer.

In view of the foregoing, it is useful to utilize a fuel cell system incorporating the DMFC or a comparable fuel cell capable of generating electric power with methanol or other directly supplied fuel, as an auxiliary power source of an automotive vehicle to supply electric power.

However, the fuel cell system incorporating the DMFC requires an additional container to be installed in an automotive vehicle for storing methanol or comparable fuel. Securing a sufficient space for this container is not easy because an available space in an automotive vehicle is limited.

SUMMARY OF THE INVENTION

In view of the above-described problems, the present invention has an object to provide a fuel cell system which is easily installable in an automotive vehicle without newly providing a space for a fuel container of the fuel cell.

In order to accomplish the above and other related objects, the present invention provides a fuel cell system including a fuel cell and a container for storing windshield washer fluid. The windshield washer fluid contains liquid fuel used for the fuel cell, and the fuel cell directly uses the liquid fuel to generate electric power.

According to the fuel cell system of the present invention, the windshield washer fluid contains fuel liquid usable for fuel cell. In general, the automotive vehicle is conventionally equipped with a container for storing windshield washer fluid.

In this respect, according to the present invention, it is not necessary to specially prepare and provide a fuel container of the fuel cell. In other words, according to the present invention, it is not necessary to specially provide a new space for installing a fuel container of the fuel cell. Thus, the fuel cell system of the present invention can be easily installed in an automotive vehicle.

Preferably, the windshield washer fluid of the present invention contains the liquid organic compound, such as ether or alcohol.

The liquid organic compound, such as ether or alcohol, can be directly used as the fuel for the fuel cell.

More specifically, it is preferable that the windshield washer fluid includes methanol and the fuel cell of the present invention is a direct methanol fuel cell.

In the case that the present invention uses the direct methanol fuel cell, it is preferable that the fuel cell system of the present invention further includes a permeable membrane through which only the methanol is permeable or the methanol is permeable together with water, so that the permeable membrane can extract the methanol from the windshield washer fluid. The extracted methanol can be directly used as the fuel for the fuel cell.

The permeable membrane can be disposed, for example, in the container storing the windshield washer fluid, or on a side surface of this container.

Furthermore, it is preferable that the permeable membrane is selected from the group consisting of a porous zeolite membrane, a porous silica membrane, and a porous organic membrane.

According to a preferable embodiment of the present invention, a permeable membrane unit incorporating the permeable membrane is provided in the windshield washer container. The permeable membrane unit is disposed horizontally in the vicinity of a bottom of the windshield washer container. A width of the permeable membrane unit is smaller than a width of the windshield washer container. The permeable membrane unit has an inside space connected via a pipe to a methanol tank provided outside the windshield washer container. The methanol extracted through the permeable membrane unit is supplied into the fuel cell via the metal methanol tank. The methanol tank has a volume small than that of the windshield washer container. A circulating pump is provided in a passage of the pipe to forcibly draw and convey the methanol into the methanol tank when the methanol is extracted through the permeable membrane unit. Furthermore, a controller is provided to control the circulating pump to adjust the concentration of the methanol stored in the methanol tank, so that the methanol having a predetermined concentration is conveyed into the fuel cell.

According to another preferable embodiment of the present invention, the permeable membrane is provided on a side surface of the windshield washer container. A diffusion layer, the fuel cell, and an air filter are successively disposed on an outer side surface of the windshield washer container where the permeable membrane is provided.

For example, it is possible to provide a partition in the windshield washer container to divide the inside space into a methanol container and a surfactant container. In this case, the permeable membrane is provided on a side surface of the methanol container. A diffusion layer, the fuel cell, and an air filter are successively disposed on an outer side surface of the methanol container.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

First Embodiment

Figure 1:
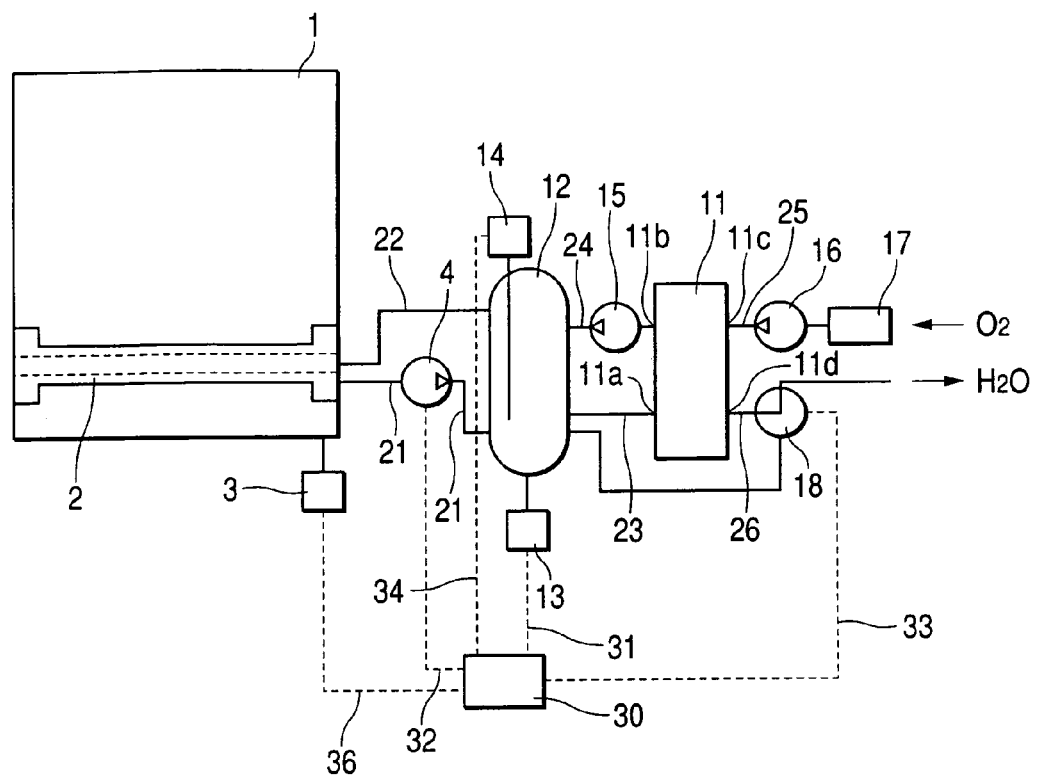
FIG. 1 is a schematic diagram showing the arrangement of a fuel cell system in accordance with a first embodiment of the present invention.

FIG. 1 shows the arrangement of a fuel cell system in accordance with a first embodiment of the present invention.

This fuel cell system is usable as an auxiliary power source for an automotive vehicle. For example, this fuel cell system is effectively used to prevent a battery from going flat in a long-lasting stopped condition of an automotive vehicle.

As shown in FIG. 1, this fuel cell system includes a windshield washer container 1, a permeable membrane unit 2, a first methanol concentration sensor 3, a first circulating pump 4, a controller 30, a fuel cell 11, a methanol tank 12, a second methanol concentration sensor 13, a liquid amount meter 14, and a switching valve 18.

The windshield washer container 1 stores windshield washer fluid used for cleaning a windshield glass of an automotive vehicle. The windshield washer container 1 is, for example, a normal windshield washer container which has been conventionally employed for the automotive vehicles but is modified by adding the permeable membrane unit 2. The windshield washer fluid contains methanol in addition to water, surfactant, and coloring agent.

Figure 2:
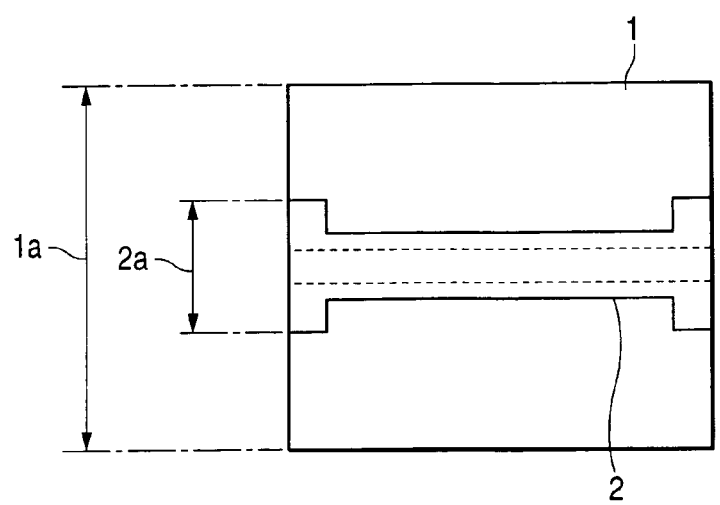
FIG. 2 is a plan view showing a windshield washer container shown in FIG. 1.

The permeable membrane unit 2 has a cylindrical shape with a hollow inside space. As shown in FIG. 1, the permeable membrane unit 2 is disposed horizontally in the vicinity of a bottom of the windshield washer container 1. FIG. 2 shows a plan view of the windshield washer container 1 shown in FIG. 1. As shown in FIG. 2, a width (i.e. diameter) 2a of the permeable membrane unit 2 is smaller than a width 1a of the windshield washer container 1. The permeable membrane unit 2 is, for example, disposed at the center of the windshield washer container 1.

The permeable membrane unit 2 has the capability of extracting methanol only or together with water from the windshield washer fluid into the inside space thereof.

More specifically, the permeable membrane unit 2 includes a methanol permselective membrane. This methanol permselective membrane is a membrane which allows only the methanol or both of the methanol and water to permeate. In other words, the surfactant and the coloring agent contained in the windshield washer fluid cannot permeate the methanol permselective membrane. For example, the methanol permselective membrane is selected from the group consisting of a porous zeolite membrane, a porous silica membrane, and a porous organic membrane.

Furthermore, the permeable membrane unit 2 has outlets connected to pipes 21 and 22 as shown in FIG. 1. The methanol extracted into the permeable membrane unit 2 can be introduced into respective pipes 21 and 22.

The first methanol concentration sensor 3 is attached to the windshield washer container 1 to measure the concentration of methanol contained in the windshield washer fluid. The first methanol concentration sensor 3 is connected to the controller 30 via a signal line 36. The controller 30 inputs the measuring result of the first methanol concentration sensor 3. The controller 30 is connected to a monitor (not shown) installed in an instrument panel of an automotive vehicle.

The controller 30, when the measuring result of the first methanol concentration sensor 3 shows that the methanol concentration is equal to or less than 1%, outputs a warning signal to the monitor. In response to this warning signal, the monitor indicates or issues warning to instruct a user to refill the windshield washer fluid.

The methanol tank 12 is filled with the methanol solution consisting of water and methanol being mixed together. The methanol tank 12 is connected to the permeable membrane unit 2 installed in the windshield washer container 1 via the pipes 21 and 22. The first circulating pump 4 is provided in the passage of the pipe 21 so as to intervene between the permeable membrane unit 2 and the methanol tank 12. The first circulating pump 4 draws the methanol, when it is extracted by the permeable membrane unit 2, and conveys it into the methanol tank 12. Thus, by the function of the first circulating pump 4, the methanol tank 12 is filled with the methanol alone or together with water extracted from the windshield washer container 1 via the permeable membrane unit 2.

The controller 30, in cooperation with the first circulating pump 4, adjusts the methanol solution in the methanol tank 12 to a predetermined methanol concentration so that it can be directly used as the fuel for the fuel cell 11. For example, the predetermined methanol concentration is 6%. The main function of the methanol tank 12 is adjusting the concentration of methanol to be supplied to the fuel cell 11, rather than storing the methanol solution. In this respect, the volume of the methanol tank 12 is small compared with that of the windshield washer container 1.

The second methanol concentration sensor 13 is attached to the methanol tank 12 to measure the methanol concentration of the methanol solution stored in the methanol tank 12.

The liquid amount meter 14 is also attached to the methanol tank 12 to measure the liquid amount of the methanol solution stored in the methanol tank 12.

The fuel cell 11 is a general direct methanol fuel cell (i.e. DMFC) which can directly use methanol as the fuel. The fuel cell 11 has a fuel inlet 11a connected to the methanol tank 12 via a pipe 23. The fuel cell 11 has a fuel outlet 11b connected to the methanol tank 12 via a pipe 24. The second circulating pump 15 is provided in the passage of the pipe 24 so as to intervene between the fuel cell 11 and the methanol tank 12. The methanol solution, being adjusted to a predetermined concentration in the methanol tank 12, is conveyed by the second circulating pump 15 to a fuel electrode side of the fuel cell 11. And, unreacted components of the fuel cell 11 are returned by the second circulating pump 15 to the methanol tank 12.

Furthermore, the fuel cell 11 has an air inlet 11c being connected to an air filter 17 via a pipe 25. An air pump 16 is provided in the passage of the pipe 25 so as to intervene between the air filter 17 and the fuel cell 11. The air, after having permeated through the air filter 17, is supplied by the air pump 16 to an air electrode side of the fuel cell 11. Furthermore, the fuel cell 11 has an air outlet lid being connected to a pipe 26 having the switching valve 18. The switching valve 18 selectively connects the pipe 26 to the methanol tank 12 or to the outside of this fuel cell system. Accordingly, by the function of the switching valve 18, the water produced based on a reaction of hydrogen and oxygen in the fuel cell 11 is selectively discharged out of the fuel cell system or introduced into the methanol tank 12.

The second methanol concentration sensor 13 is, as shown in FIG. 1, connected to the controller 30 via a signal line 31. Thus, the controller 30 inputs the measuring result of the second methanol concentration sensor 13. Furthermore, the controller 30 is connected to the first circulating pump 4 via a signal line 32. The controller 30 is connected to the switching valve 18 via a signal line 33. The controller 30 outputs activation signals to the first circulating pump 4 and the switching valve 18, respectively.

When the detection result of the second methanol concentration sensor 13 shows that the methanol concentration of the methanol solution exceeds a predetermined concentration, the controller 30 outputs a deactivation signal to the first circulating pump 4 to stop operation of the first circulating pump 4. Furthermore, the controller 30 outputs a switching signal to the switching valve 18 to introduce the water produced in the fuel cell 11 to the methanol tank 12. In response to these signals, the first circulating pump 4 stops its operation and the produced water is circulated from the fuel cell 11 into the methanol tank 12.

On the other hand, when the methanol concentration of the methanol solution is lower than a predetermined concentration, the controller 30 outputs an activation signal to the first circulating pump 4 to drive the first circulating pump 4. Furthermore, the controller 30 outputs a switching signal to the switching valve 18 to discharge the air produced in the fuel cell 11 out of the fuel cell system. In response to these signals, the methanol extracted from the windshield washer container 1 through the permeable membrane unit 2 is introduced into the methanol tank 12.

As apparent from the foregoing description, according to the fuel cell system of this embodiment, the controller 30 activates or deactivates the first circulating pump 4 and switches the switching valve 18 based on the detection result of the second methanol concentration sensor 13 in such a manner that the methanol concentration of the methanol solution can be maintained at a predetermined concentration value (or in a predetermined concentration range).

Furthermore, the liquid amount meter 14 is connected to the controller 30 via a signal line 34. Thus, the controller 30 inputs the measuring result of the liquid amount meter 14. According to the fuel cell system of this embodiment, the controller 30 controls the first circulating pump 4 and the switching valve 18 based on the detection result of the liquid amount meter 14, in such a manner that the liquid amount of the methanol solution stored in the methanol tank 12 is greater than a predetermined value. Namely, the controller 30 controls the liquid amount of the methanol solution in addition to the methanol concentration of the methanol solution.

As described above, according to the fuel cell system of this embodiment, when the methanol solution amount in the methanol tank 12 is small, the controller 30 controls the first circulating pump 4 and the switching valve 18 to charge and store a sufficient amount of methanol solution in the methanol tank 12.

Furthermore, the controller 30 receives an output voltage of the fuel cell and causes the monitor to indicate the output voltage of the fuel cell. Thus, an indicator in a passenger compartment can display the operating conditions of the fuel cell. For example, even if the methanol amount in the container 1 is sufficient, the fuel cell output may become an extremely low value or the methanol concentration in the tank 12 may become a low value. In such a case, the controller 30 judges that an abnormal situation occurs and outputs this judgment result to the monitor. The indicator instructs a driver to check the fuel cell system.

According to the above-described fuel cell system, the permeable membrane unit 2 extracts methanol together with water or methanol alone from the windshield washer fluid. Then, the extracted methanol is conveyed and stored in the methanol tank 12. The methanol concentration of the methanol solution stored in the methanol tank 12 is adjusted to a predetermined value. Then, the methanol solution having the predetermined concentration is supplied into the fuel cell 11. The fuel cell 11 generates electric power with the supplied methanol solution.

As described above, the fuel cell system of this embodiment extracts methanol from the windshield washer fluid and directly uses the extract methanol as the fuel supplied into the fuel cell 11.

Accordingly, the fuel cell system of this embodiment can utilize the windshield washer fluid installed in an ordinary automotive vehicle to extract methanol being directly used as the fuel supplied to the fuel cell 11. In this respect, the fuel cell system of this embodiment is advantageous in that no special fuel tank is required for the fuel cell.

Although the windshield washer container 1 used in this embodiment is a general type, it is possible to use a compact windshield washer container smaller than the general windshield washer container. As far as the windshield washer container 1 of this embodiment is not greater in size than the general windshield washer container, it is easy to secure a sufficient space in an automotive vehicle for installing the windshield washer container 1 of this embodiment.

Furthermore, the conventional fuel cell system using the DMFC is inconvenient because users are currently unable to obtain methanol at gas stations and accordingly it is difficult to refuel the DMFC. Therefore, unless the gas stations are renovated to have the capability of supplying methanol, the users cannot get methanol for the DMFC.

On the other hand, the fuel cell system of this embodiment is based on the windshield washer fluid which is widely sold in car shops or the like. Accordingly, it is easy for the users to get the windshield washer fluid. The windshield washer fluid is equipped in every automotive vehicle. Compared with the methanol exclusively used for the fuel cell, the users can easily get the windshield washer fluid. In other words, the fuel cell system of this embodiment does not require special facilities that can supply methanol for the fuel cell. Accordingly, this embodiment can improve the convenience for the users compared with conventional fuel cell systems using the DMFC. Namely, this embodiment can provide a fuel cell system capable of improving the convenience for the users compared with conventional fuel cell systems using the DMFC.

According to this embodiment, the fuel for the fuel cell system is methanol contained in the windshield washer fluid. Therefore, the maximum electric power amount producible from the fuel cell 11 is dependent on the size of the windshield washer container 1. In this respect, the windshield washer container 1 used in this embodiment has a general size and the producible electric power amount is limited to a certain amount. Therefore, the fuel cell system of this embodiment is preferably used as a small or compact power source.

Second Embodiment

Figure 3:
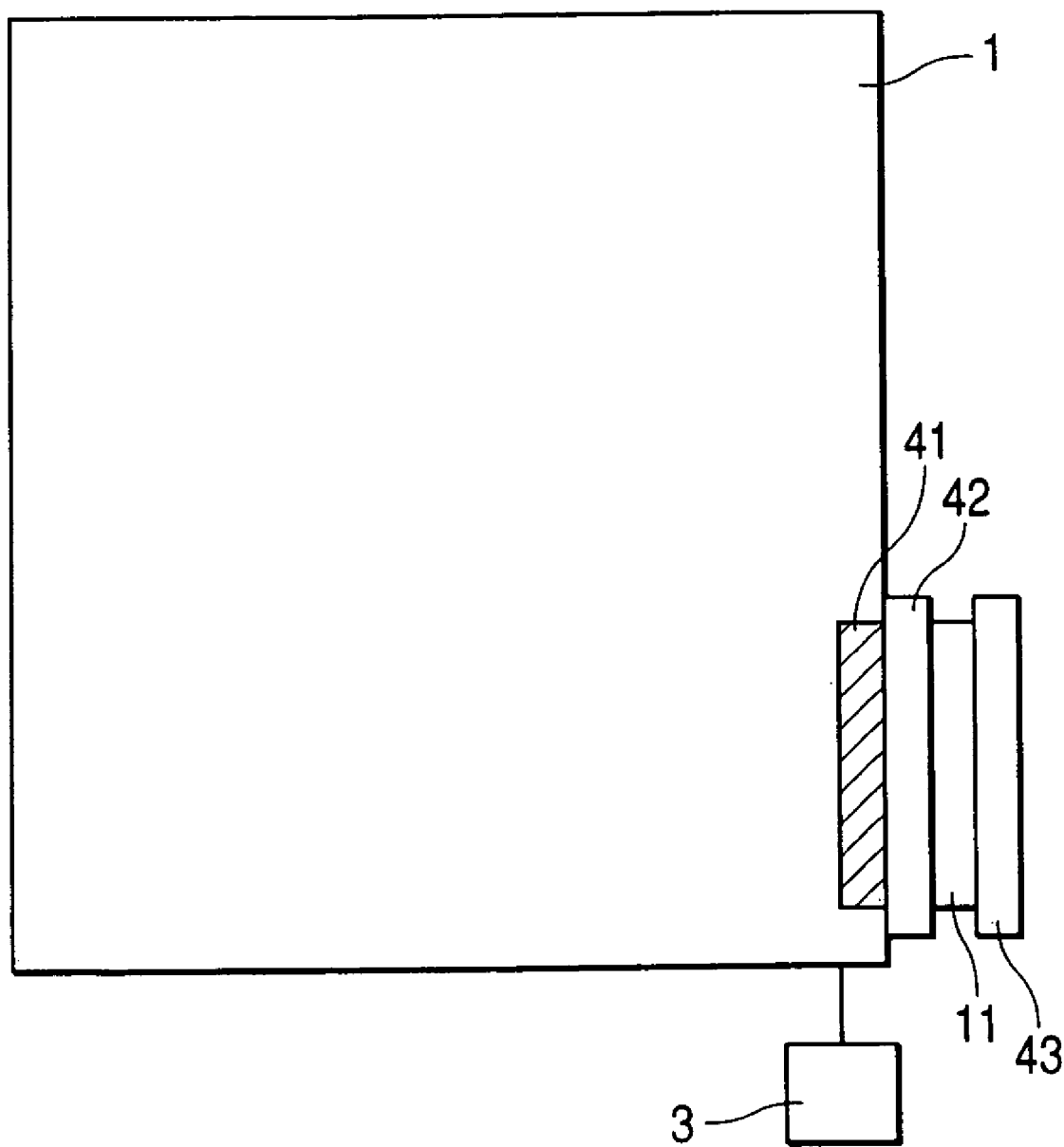
FIG. 3 is a schematic diagram showing the arrangement of a fuel cell system in accordance with a second embodiment of the present invention.

FIG. 3 shows the arrangement of a fuel cell system in accordance with a second embodiment of the present invention. The components and portions in FIG. 3 are denoted by the same reference numerals as those of FIG. 1 when they are identical with those of the fuel cell system according to the first embodiment.

According to the first embodiment, the fuel cell system includes the first circulating pump 4, the second circulating pump 15, and the air pump 16 to forcibly supply methanol and air to the fuel cell 11. The second embodiment is different from the first embodiment in that the first circulating pump 4, the second circulating pump 15, and the air pump 16 are omitted. In other words, the second embodiment provides a fuel cell system which is capable of introducing methanol and air into the fuel cell 11 based on natural diffusion.

As shown in FIG. 3, the fuel cell system of this embodiment includes a permeable membrane 41 provided on a side surface of the windshield washer container 1 in the vicinity of the bottom of the windshield washer container 1. A diffusion layer 42, the fuel cell 11, and an air filter 43 are successively disposed on the outer side surface of the windshield washer container 1 where the permeable membrane 41 is provided.

Like the first embodiment, the windshield washer container 1 is a general windshield washer container. The permeable membrane 41 is a methanol permselective membrane which is configured into a plate shape. The permeable membrane 41 of the second embodiment corresponds to the permeable membrane unit 2 disclosed in the first embodiment. The permeable membrane 41 is different in configuration from the permeable membrane unit 2, although the rest of the arrangement is substantially identical with each other. In general, the windshield washer fluid may contain foreign substances or dusts. In this respect, disposing the permeable membrane 41 at the altitude slightly higher than the bottom of the windshield washer container 1 is effective in preventing such foreign substances or dusts from adhering on the surface of the permeable membrane 41.

The diffusion layer 42 is disposed on the fuel electrode side of the fuel cell 11. Furthermore, the diffusion layer 42 is arranged by porous cotton, for example, made of a fluorine group resin. The diffusion layer 42 adsorbs methanol due to the capillary action and accordingly promotes the diffusion of methanol into the fuel cell 11. It is however possible to omit the diffusion layer 42 and directly dispose the fuel cell 11 on the permeable membrane 41. However, to surely supply a sufficient amount of methanol into the fuel cell 11, it is desirable to interpose the diffusion layer 42 between the permeable membrane 41 and the fuel cell 11.

The air filter 43 is disposed on the air electrode side of the fuel cell 11. In general, the air may contain foreign substances or dusts. The air filter 43 prevents such foreign substances or dusts from depositing on the air electrode of the fuel cell 11.

According to the fuel cell system of this embodiment, the methanol contained in the windshield washer fluid is extracted via the permeable membrane 41 due to natural diffusion. The extracted methanol is supplied via the diffusion layer 42 to the fuel electrode side of the fuel cell 11. The natural diffusion is referred to as a phenomenon that the methanol flows from the higher concentration side to the lower concentration side. On the other hand, air is supplied to the air electrode side of the fuel cell 11 via the air filter 43 due to natural diffusion. Thus, the fuel cell 11 can generate electric power.

Like the first embodiment, the fuel cell system of this embodiment uses general windshield washer fluid and the windshield washer container 1. Accordingly, this embodiment brings the effects substantially identical with those of the first embodiment.

Furthermore, this embodiment utilizes the natural diffusion in extracting the methanol from the windshield washer fluid and then supplying the extracted methanol into the fuel cell 11, and also in supplying the air into the fuel cell 11. Therefore, the fuel cell system of this embodiment can omit all of the first circulating pump 4, the second circulating pump 15, the air pump 16, and the methanol tank 12 which are required in the fuel cell system of the first embodiment. Accordingly, compared with the first embodiment, this embodiment can simplify the arrangement of the fuel cell system.

According to the fuel cell system of this embodiment, an output of the fuel cell is relatively small because it depends on the natural diffusion, compared with the fuel cell system of the first embodiment which forcibly supplies the methanol into the fuel cell. Therefore, the fuel cell system of this embodiment is preferably used as a fuel cell system for very low electric power devices.

Third Embodiment

Figure 4:
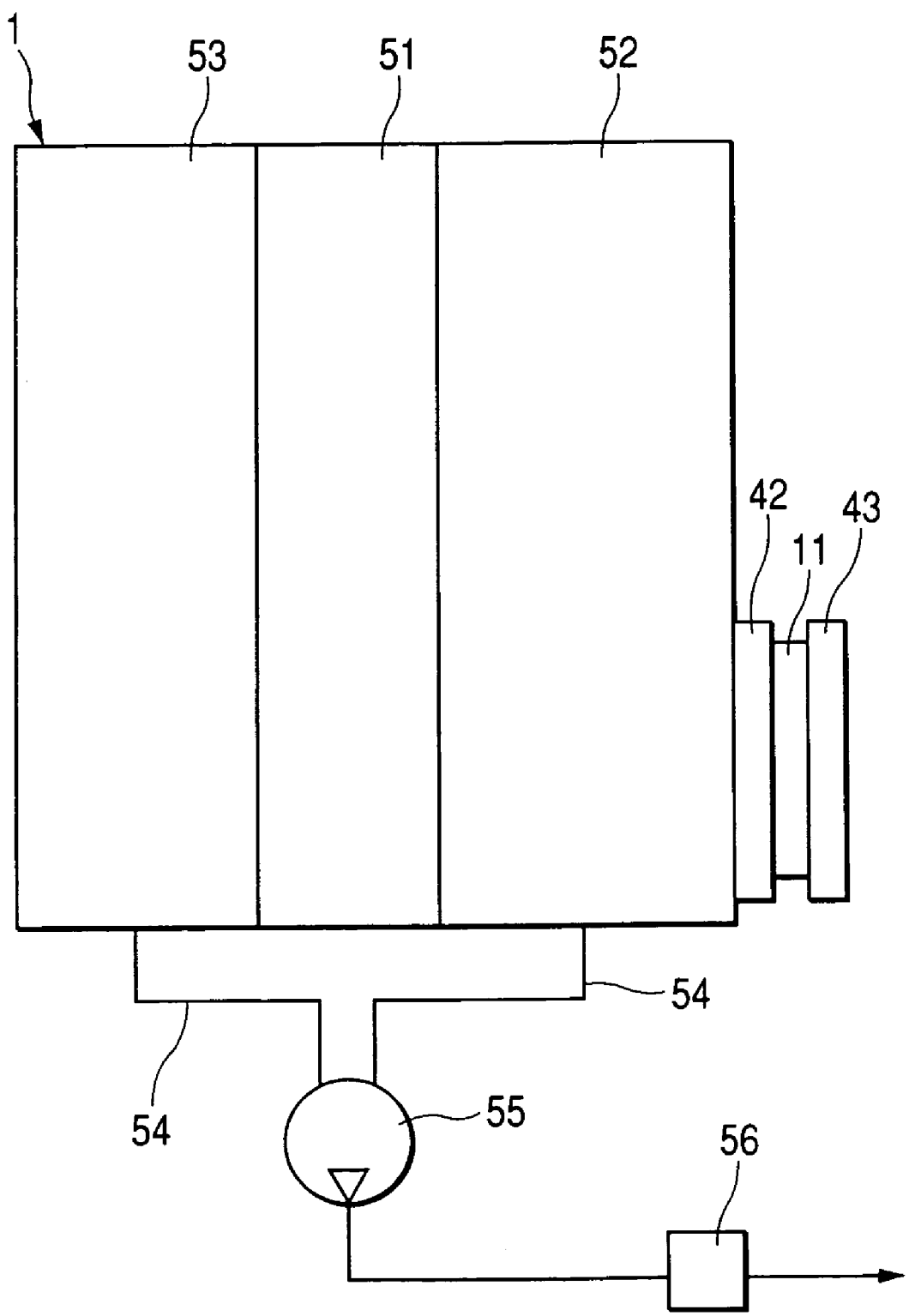
FIG. 4 is a schematic diagram showing the arrangement of a fuel cell system in accordance with a third embodiment of the present invention.

FIG. 4 shows the arrangement of a fuel cell system in accordance with a third embodiment of the present invention. The components and portions in FIG. 4 are denoted by the same reference numerals as those of FIG. 3 when they are identical with those of the fuel cell system according to the second embodiment. The fuel cell system according to this embodiment is different from the fuel cell system according to the second embodiment in the arrangement of the windshield washer container 1.

The windshield washer container 1 of this embodiment is a general type. However, as shown in FIG. 4, the windshield washer container 1 has a partition 51 to divide the inside space into two chambers, i.e. a methanol container 52 and a surfactant container 53.

The methanol container 52 stores methanol and water, while the surfactant container 53 stores surfactant. The methanol and the surfactant of this embodiment correspond to the windshield washer fluid of the present invention.

Like the second embodiment, the diffusion layer 42, the fuel cell 11, and the air filter 43 are successively disposed on an outer side surface of the methanol container 52.

A washer pump 55 is connected to each of the methanol container 52 and the surfactant container 53 via a pipe 54. The washer pump 55 sucks up methanol and surfactant into a nozzle 56 attached to the downstream side of the washer pump 55. The washer pump 55 and the nozzle 56 of this embodiment cooperatively mix the methanol stored in the methanol container 52 and the surfactant stored in the surfactant container 53 and then spray the mixed liquid.

According to the fuel cell system of this embodiment, the methanol in the methanol container 52 is supplied via the diffusion layer 42 to the fuel electrode side of the fuel cell 11. Furthermore, the air is supplied via air filter 43 to the air electrode side of fuel cell 11 based on the natural diffusion. Accordingly, the fuel cell 11 generates electric power.

According to the fuel cell system of this embodiment, the windshield washer container 1 is a general type and accordingly it is not necessary to additionally install a fuel tank for the fuel cell.

Furthermore, according to this embodiment, the inside space of the windshield washer container 1 is divided into the chamber for storing the surfactant and the chamber for storing the methanol. Thus, it is possible to omit the permeable membrane used in the second embodiment.

The above-described windshield washer container 1 of this embodiment integrates the methanol container 52 and the surfactant container 53 via the partition 51. However, it is possible to separately or independently provide the methanol container 52 and the surfactant container 53 on an automotive vehicle, instead of using the integrated windshield washer container 1 of this embodiment. In this case, the total space required for the methanol container 52 and the surfactant container 53 should be equivalent to or less than the volume of the general windshield washer container.

Regarding the method for refilling the methanol or the surfactant, the methanol can be poured into the methanol container 52 and the surfactant can be poured into the surfactant container 53, respectively. Alternatively, it is possible to use a cartridge type container for each of the methanol container 52 and the surfactant container 53.

More specifically, it is preferable to prepare methanol cartridges being filled with methanol and surfactant cartridges being filled with surfactant beforehand so that the empty cartridge can be simply replaced with a new cartridge of the same type. This is advantageous in surely preventing the different liquid from being erroneously poured into the methanol container 52 or the surfactant container 53. According to this method, it is possible to exchange the methanol container 52 alone or exchange the entire fuel cell 11 together with the methanol container 52. For example, in the case that the lifetime of the fuel cell 11 is short, exchanging the entire fuel cell 11 will be preferable in view of reliability, rather than replacing only the methanol container 52.

Other Embodiments

According to the first embodiment, the permeable membrane unit 2 is provided in the windshield washer container 1. According to the second embodiment, the permeable membrane 41 is provided in the windshield washer container 1. However, it is possible to omit the permeable membrane unit 2 from the fuel cell system in the first embodiment. It is possible to omit the second permeable membrane 41 from the fuel cell system in the second embodiment. Namely, it is possible to directly use the windshield washer fluid stored in the windshield washer container 1 as the fuel for the fuel cell.

When the windshield washer fluid contains alkaline surfactant, properties of the DMFC may deteriorate. Therefore, it will be desirable that the windshield washer fluid contains appropriate addition agent, such as nonionic surfactant, to prevent the DMFC properties from deteriorating.

Furthermore, according to the first and second embodiments, location of the permeable membrane unit 2 or the permeable membrane 41 is not limited to the inside of the windshield washer container 1. For example, it is possible to locate the permeable membrane unit 2 or the permeable membrane 41 anywhere between the windshield washer container 1 and the fuel cell 11.

Furthermore, according to each of the above-described embodiments, the fuel cell 11 uses the DMFC. However, it is possible to use any other fuel cell as far as the fuel cell can generate electric power by directly using the liquid fuel other than methanol. In this case, the windshield washer fluid contains the liquid fuel for the fuel cell.

It is desirable that the fuel cell can generate electric power by directly using liquid organic compound, such as ethanol or other alcohol, dimethyl-ether or other ether, or the like. Furthermore, it is preferable that the windshield washer fluid contains liquid organic compound, such as alcohol and ether.

What is claimed is:

1. A fuel cell system comprising:
   a fuel cell;
   a windshield washer container for storing windshield washer fluid; and
   a permeable membrane incorporated in a permeable membrane unit disposed in the windshield washer container,
   wherein the windshield washer fluid contains methanol as liquid fuel used for the fuel cell,
   the fuel cell is a direct methanol fuel cell and directly uses the liquid fuel to generate electric power, only the methanol is permeable through the permeable membrane or the methanol is permeable together with water, so that the permeable membrane can extract the methanol from the windshield washer fluid, and
   the permeable membrane unit has an inside space connected via a pipe to a methanol tank provided outside the windshield washer container, and the methanol extracted through the permeable membrane unit is supplied into the fuel cell via the methanol tank.

2. The fuel cell system in accordance with claim 1, wherein the methanol tank has a volume smaller than that of the windshield washer container.

3. The fuel cell system in accordance with claim 1, wherein a circulating pump is provided in a passage of the pipe to forcibly draw and convey the methanol into the methanol tank when the methanol is extracted through the permeable membrane unit.

4. The fuel cell system in accordance with claim 1, wherein a controller is provided to control a circulating pump to adjust a concentration of the methanol stored in the methanol tank, so that the methanol having a predetermined concentration is conveyed from the methanol tank into the fuel cell.

5. The fuel cell system in accordance with claim 1, wherein the permeable membrane is selected from the group consisting of a porous zeolite membrane, a porous silica membrane, and a porous organic membrane.

6. The fuel cell system in accordance with claim 1, wherein the permeable membrane unit is disposed horizontally in a vicinity of a bottom of the windshield washer container.

7. The fuel cell system in accordance with claim 1, wherein a width of the permeable membrane unit is smaller than a width of the windshield washer container.

8. A fuel cell system comprising:
   a fuel cell;
   a windshield washer container for storing windshield washer fluid; and
   a permeable membrane provided on a side surface of the windshield washer container, and on an outer side surface of the windshield washer container, a diffusion layer, the fuel cell, and an air filter are successively disposed,
   wherein the windshield washer fluid contains methanol as liquid fuel used for the fuel cell,
   the fuel cell is a direct methanol fuel cell and directly uses the liquid fuel to generate electric power, and
   only the methanol is permeable through the permeable membrane or the methanol is permeable together with water, so that the permeable membrane can extract the methanol from the windshield washer fluid.

9. The fuel cell system in accordance with claim 8, wherein the permeable membrane is selected from the group consisting of a porous zeolite membrane, a porous silica membrane, and a porous organic membrane.

10. A fuel cell system comprising:

a fuel cell;

a windshield washer container for storing windshield washer fluid; and a permeable membrane, wherein the windshield washer fluid contains methanol as liquid fuel used for the fuel cell, the fuel cell is a direct methanol fuel cell and directly uses the liquid fuel to generate electric power, only the methanol is permeable through the permeable membrane or the methanol is permeable together with water, so that the permeable membrane can extract the methanol from the windshield washer fluid, the windshield washer container has a partition to divide the inside space into a methanol container and a surfactant container, and the permeable membrane is provided on a side surface of the methanol container, and a diffusion layer, the fuel cell, and an air filter are successively disposed on an outer side surface of the methanol container.

11. The fuel cell system in accordance with claim 10, wherein the permeable membrane is selected from the group consisting of a porous zeolite membrane, a porous silica membrane, and a porous organic membrane.

* * * * *